United States Patent
Shahidi et al.

(10) Patent No.: US 10,671,317 B2
(45) Date of Patent: Jun. 2, 2020

(54) BLOCK CLEANUP: PAGE RECLAMATION PROCESS TO REDUCE GARBAGE COLLECTION OVERHEAD IN DUAL-PROGRAMMABLE NAND FLASH DEVICES

(71) Applicant: Samsung Electronics Co., Ltd., Suwon-si, Gyeonggi-do (KR)

(72) Inventors: Narges Shahidi, Austin, TX (US); Manu Awasthi, San Jose, CA (US); Tameesh Suri, San Jose, CA (US); Vijay Balakrishnan, Mountain View, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 671 days.

(21) Appl. No.: 15/405,227

(22) Filed: Jan. 12, 2017

(65) Prior Publication Data

US 2017/0344307 A1  Nov. 30, 2017

Related U.S. Application Data

(63) Continuation-in-part of application No. 15/217,964, filed on Jul. 22, 2016.
(Continued)

(51) Int. Cl.
*G06F 3/06* (2006.01)

(52) U.S. Cl.
CPC .......... *G06F 3/0652* (2013.01); *G06F 3/0611* (2013.01); *G06F 3/0661* (2013.01);
(Continued)

(58) Field of Classification Search
CPC .... G06F 3/0652; G06F 3/0611; G06F 3/0679; G06F 3/0661; G06F 2212/1024;
(Continued)

(56) References Cited

U.S. PATENT DOCUMENTS 8,472,280 B2  6/2013 Li
8,990,484 B2  3/2015 Kang
(Continued)

OTHER PUBLICATIONS

FLASHDBA, "Understanding Flash: Garbage Collection Matters," Oct. 15, 2014, (https://flashdba.com/category/storage-for-dbas/understanding-flash/), retrieved Jun. 27, 2016, 20 pages.
(Continued)

*Primary Examiner* — Masud K Khan
(74) *Attorney, Agent, or Firm* — Renaissance IP Law Group LLP

(57) ABSTRACT

According to one general aspect, an apparatus may include a memory, an erasure-based, non-volatile memory, and a processor. The memory may be configured to store a mapping table, wherein the mapping table indicates a rewriteable state of a plurality of memory addresses. The erasure-based, non-volatile memory may be configured to store information, at respective memory addresses, in an encoded format. The encoded format may include more bits than the unencoded version of the information and the encoded format may allow the information be over-written, at least once, without an intervening erase operation. The processor may be configured to perform garbage collection based, at least in part upon, the rewriteable state associated with the respective memory addresses.

20 Claims, 8 Drawing Sheets

Related U.S. Application Data

(60) Provisional application No. 62/341,584, filed on May 25, 2016, provisional application No. 62/409,319, filed on Oct. 17, 2016.

(52) U.S. Cl.
    CPC .... *G06F 3/0679* (2013.01); *G06F 2212/1024* (2013.01); *G06F 2212/2022* (2013.01); *G06F 2212/40* (2013.01); *G06F 2212/403* (2013.01); *G06F 2212/7201* (2013.01)

(58) Field of Classification Search
    CPC ..... G06F 2212/2022; G06F 2212/7201; G06F 2212/40; G06F 2212/403
    See application file for complete search history.

(56) References Cited

U.S. PATENT DOCUMENTS

| | | |
|---|---|---|
| 9,021,185 B2 | 4/2015 | Ban |
| 9,123,422 B2 | 9/2015 | Yu et al. |
| 9,141,526 B2 | 9/2015 | Iliadis |
| 2004/0160343 A1 | 8/2004 | Sprouse |
| 2009/0086880 A1 | 4/2009 | Shen et al. |
| 2013/0073785 A1 | 3/2013 | Emma et al. |
| 2013/0265830 A1 | 10/2013 | Bisen |
| 2013/0322175 A1 | 12/2013 | Kong et al. |
| 2014/0089564 A1 | 3/2014 | Liu et al. |
| 2014/0115239 A1 | 4/2014 | Kong et al. |
| 2014/0223089 A1* | 8/2014 | Kang .................. G06F 12/0246 711/103 |
| 2015/0019797 A1 | 1/2015 | Huang et al. |
| 2016/0062828 A1 | 3/2016 | Yeh |
| 2016/0062831 A1 | 3/2016 | Laurent et al. |
| 2016/0124848 A1 | 5/2016 | Bellorado et al. |
| 2016/0321138 A1 | 11/2016 | Nakamura et al. |
| 2017/0351603 A1* | 12/2017 | Zhang .................. G06F 12/0246 |

OTHER PUBLICATIONS

Wikipedia, the free encyclopedia, "Flash memory," (https://en.wikipedia.org/wiki/Flash_memory), retrieved Jun. 25, 2016, 19 pages.
Final Office Action for U.S. Appl. No. 15/217,964, dated Sep. 7, 2018.
Office Action for U.S. Appl. No. 15/217,964, dated Feb. 21, 2018.
Office Action for U.S. Appl. No. 15/217,964, dated Jan. 15, 2019.
Notice of Allowance for U.S. Appl. No. 15/217,964, dated Jul. 1, 2019.

* cited by examiner

FIG. 2
200

| LPA 292 | PPA 294 | RW Status 296 |
|---|---|---|
| 0x1234 5678 | 0xABCD | Free |
| 0x1357 2468 | 0x1476 | Valid-I |
| 0x2468 1357 | 0x483F | Valid-II |
| 0x3579 ACDE | 0xFEED | Invalid |
| ... | ... | ... |
| 0x7834 FEED | 0x0345 | Valid-I |
| 0xDEAD BEEF | 0x7D3A | Valid-II |

201 — row 1
202 — row 2
203 — row 3
204 — row 4
205 — row 5
206 — row 6

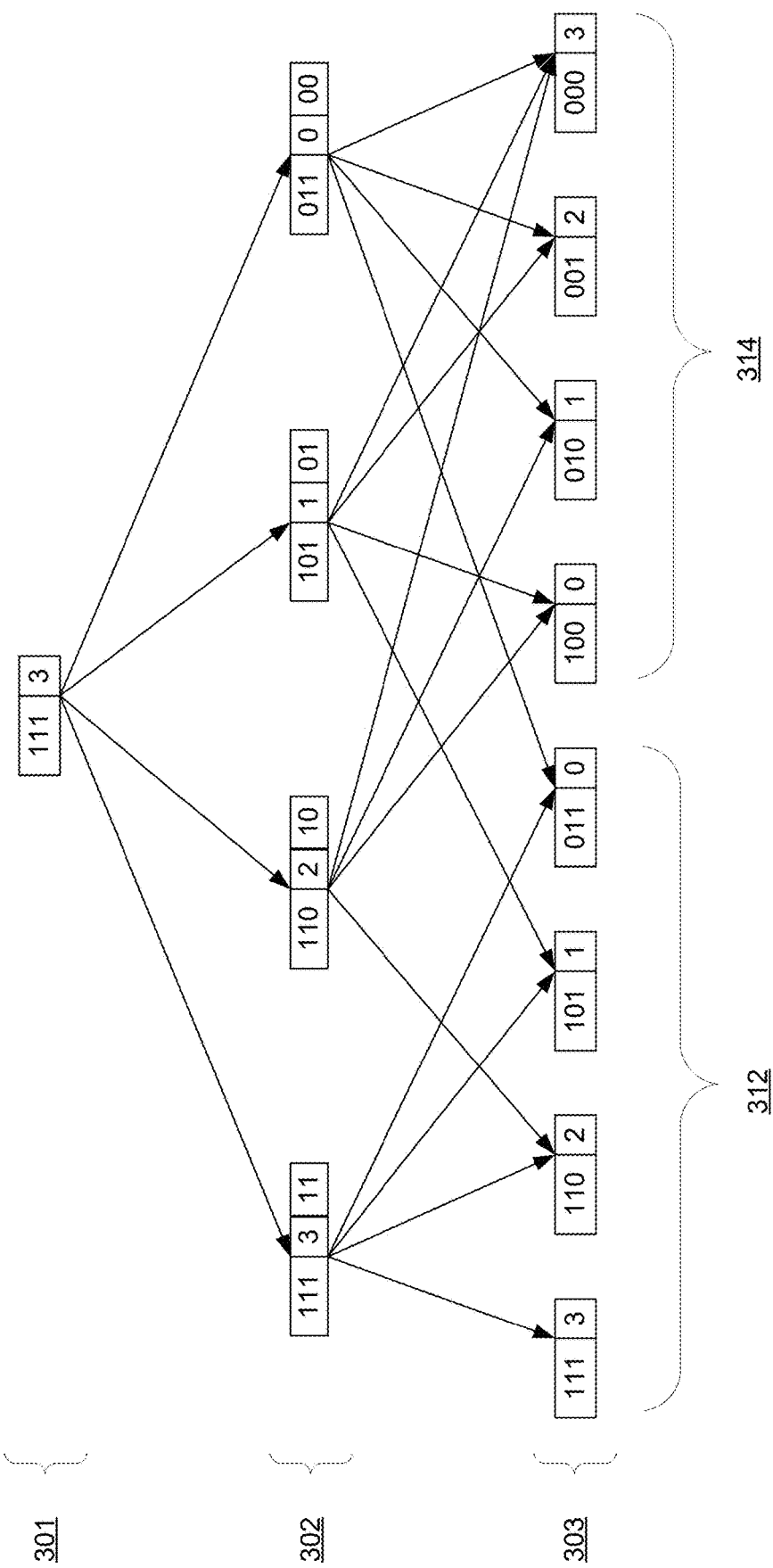

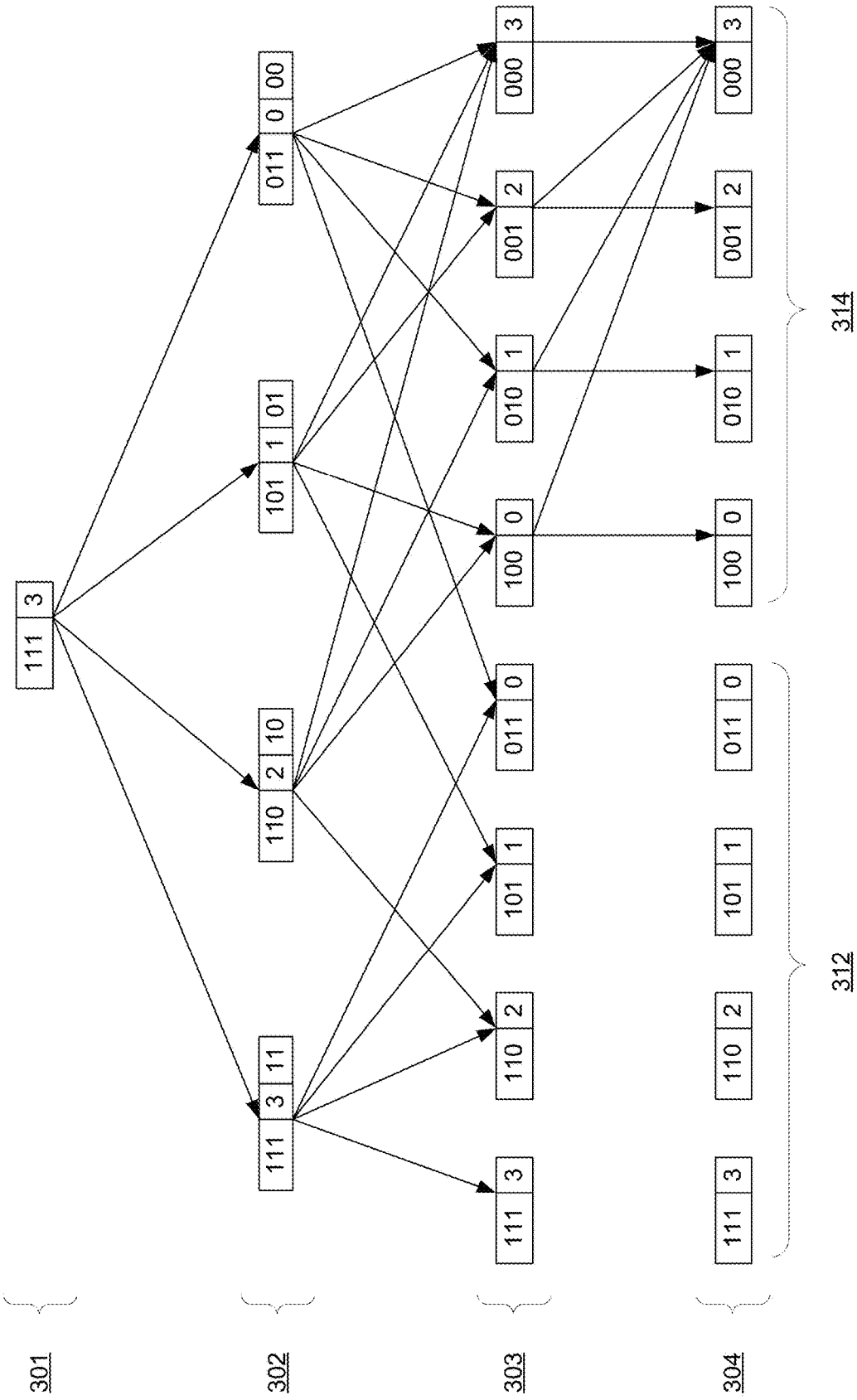

FIG. 4
400

| | PPA 494 | Flip-able Bits 496 |
|---|---|---|
| 401 | 0xABCD | 0 |
| 402 | 0x1476 | 7 |
| 403 | 0x483F | 12 |
| 404 | 0xFEED | 5 |
| ... | ... | ... |
| 405 | 0x0345 | 1 |
| 406 | 0x7D3A | 0 |

BLOCK CLEANUP: PAGE RECLAMATION PROCESS TO REDUCE GARBAGE COLLECTION OVERHEAD IN DUAL-PROGRAMMABLE NAND FLASH DEVICES

CROSS-REFERENCE TO RELATED APPLICATION

This application is a continuation-in-part of, and claims priority under 35 U.S.C. § 120 to, application Ser. No. 15/217,964, filed on Jul. 22, 2016, which claims the priority benefit, under 35 U.S.C. § 119, of U.S. Provisional Application Ser. No. 62/341,584, entitled "MULTI-BIT DATA REPRESENTATION FRAMEWORK TO ENABLE DUAL PROGRAM OPERATION ON SOLID-STATE FLASH DEVICES" filed on May 25, 2016. The subject matter of these earlier filed applications are hereby incorporated by reference.

This application claims priority under 35 U.S.C. § 119 to Provisional Patent Application Ser. No. 62/409,319, entitled "BLOCK CLEANUP: PAGE RECLAMATION PROCESS TO REDUCE GARBAGE COLLECTION OVERHEAD IN DUAL-PROGRAMMABLE NAND FLASH DEVICES" filed on Oct. 17, 2016.

The subject matter of this earlier filed application is hereby incorporated by reference.

TECHNICAL FIELD

This description relates to data storage, and more specifically to the reduction of tail latency in erasure-based storage devices.

BACKGROUND

Predictable performance is often an important design goal in several cloud and datacenter services, including search engines, data analytics, machine learning, and social media. Each of these services tend to be extremely latency sensitive and generally operate under strict service level agreements (SLAs). Specifically, coarse grain metrics like average response time are often not representative of overall performance and worst case latencies are frequently much more of a concern. Variability of response times causes high tail latency in components of a service, leading to violation of SLAs and more importantly leading to longer response time for users. Tail latency is the latency experienced by some but very few operations. The longest latency defines, for each service, the end of its tail.

Flash or solid state memories then to have quicker response times than traditional memory devices. However, because flash memories are generally derived from electrically erasable programmable read-only memory (EEPROM) technology, their memory cells generally have to be erased before they can be written or re-written to (i.e. flash is not generally an update-in-place technology). This causes irregularities in flash performance as externally initiated operation (e.g., reads, writes) may occur when an internally initiated operation (e.g., an erase operation, move operation, garbage collection, etc.) is occurring. This may cause the externally initiated operation to stall as the maintenance-based operation is being performed. Often these maintenance operations (specifically the erase operation) tend to be very slow (comparatively), exacerbating any wait or delay.

Currently, replication is frequently employed to deal with tail latency inconsistencies. The same memory access may be issued to multiple storage devices, wherein each storage device is often a mirror of each other. Frequently, whatever device returns the first result (e.g., because it is on a different internal maintenance schedule) is the device whose result is used. The results from the other devices are discarded, as no longer important. This generally involves more servers and bandwidth, and is generally wasteful and expensive. Further, the software (e.g., operating system, drivers, etc.) must be complex enough to handle the parallel nature of the replicated scheme. It may be desirable to alter the technology to allow for more consistent and predictable performance.

SUMMARY

According to one general aspect, an apparatus may include a host interface, a memory, a processor, and an erasure-based, non-volatile memory. The host interface may receive a write command, wherein the write command includes unencoded data. The memory may store a mapping table, wherein the mapping table indicates a rewriteable state of a plurality of memory addresses. The processor may select a memory address to store information included by the unencoded data based, at least in part, upon the rewriteable state of the memory address. The erasure-based, non-volatile memory may store, at the memory address, the unencoded data's information as encoded data, wherein the encoded data includes more bits than the unencoded data and wherein the encoded data can be over-written with a second unencoded data without an intervening erase operation.

According to another general aspect, a system may include a processor and erasure-based, non-volatile memory device. The processor may be configured to transmit a first write command and at least a second write command to an erasure-based, non-volatile memory device, wherein the first and second write commands each include unique unencoded data. The erasure-based, non-volatile memory device may be configured to perform, to a single target physical memory address, the first and at least the second write commands without an intervening erase operation. The erasure-based, non-volatile memory device may include an internal processor to convert each of the unencoded data to respective at least first encoded data and second encoded data, and update, as part of performing each write command, a rewriteable state associated with the target physical memory address. The erasure-based, non-volatile memory device may include non-volatile memory to store, in response to the first write command and at the target physical memory address, the first encoded data; refrain from performing a erase operation to the target physical memory address; and store, in response to the second write command and at the target physical memory address, the second encoded data.

According to another general aspect, an apparatus may include an internal processor, and an erasure-based memory. The internal processor may be configured to: receive a first write command that includes a first unencoded data, determine a target memory address to store the information included in the first unencoded data, convert the first unencoded data to a first encoded data, store the first encoded data in an erasure-based memory at the target memory address, receive a second write command that includes a second unencoded data, convert the second unencoded data to a second encoded data, without performing an erase operation on the target memory address, store the second encoded data in the erasure-based memory at the target memory address. The erasure-based memory may be configured to store data by flipping bits in a unidirectional fashion, and erase stored data by resetting all of the bits at a memory address to a predetermined state from which the bits may be flipped in the unidirectional fashion.

According to one general aspect, an apparatus may include a memory, an erasure-based, non-volatile memory, and a processor. The memory may be configured to store a mapping table, wherein the mapping table indicates a rewriteable state of a plurality of memory addresses. The erasure-based, non-volatile memory may be configured to store information, at respective memory addresses, in an encoded format. The encoded format may include more bits than the unencoded version of the information and the encoded format may allow the information be over-written, at least once, without an intervening erase operation. The processor may be configured to perform garbage collection based, at least in part upon, the rewriteable state associated with the respective memory addresses.

According to another general aspect, a system may include a processor, and an erasure-based, non-volatile memory device. The processor may be configured to transmit memory commands to an erasure-based, non-volatile memory device. The erasure-based, non-volatile memory device may be configured to perform, to a single target physical memory address, a first and at least a second write commands without an intervening erase operation. The erasure-based, non-volatile memory device may include a non-volatile memory configured to: store the information, at respective memory addresses, in an encoded format, wherein the encoded format includes more bits than the an unencoded version of the information and wherein the encoded format allows the information be over-written, at least once, without an intervening erase operation, and update, as part of performing each write command, a rewritable state associated with a respective physical memory address. The erasure-based, non-volatile memory device may include an internal processor configured to: perform garbage collection based, at least in part upon, the rewriteable state associated with the respective memory addresses.

According to another general aspect, 17. a method may include storing information, at respective memory addresses within erasure-based, non-volatile memory, in an encoded format, wherein the encoded format includes more bits than the an unencoded version of the information and wherein the encoded format allows the information be over-written, at least once, without an intervening erase operation. The method may include selecting a victim block of memory addresses to perform at least partial garbage collection upon. The method may include determining if, within the victim block, at least one memory address is associated with a rewriteable state that does not require an intervening erase operation. The method may include if so, copying the information stored at the victim block's at least one memory address to a second memory address outside of the victim block.

The details of one or more implementations are set forth in the accompanying drawings and the description below. Other features will be apparent from the description and drawings, and from the claims.

A system and/or method for data storage, and more specifically to the reduction of tail latency in erasure-based storage devices, substantially as shown in and/or described in connection with at least one of the figures, as set forth more completely in the claims.

BRIEF DESCRIPTION OF THE DRAWINGS

FIG. 2 is a block diagram of an example embodiment of a data structure in accordance with the disclosed subject matter.

FIG. 3a is a diagram of an example embodiment of an encoding scheme in accordance with the disclosed subject matter.

FIG. 3b is a diagram of an example embodiment of an encoding scheme in accordance with the disclosed subject matter.

FIG. 4 is a block diagram of an example embodiment of a data structure in accordance with the disclosed subject matter.

Like reference symbols in the various drawings indicate like elements.

DETAILED DESCRIPTION

Figure 1:
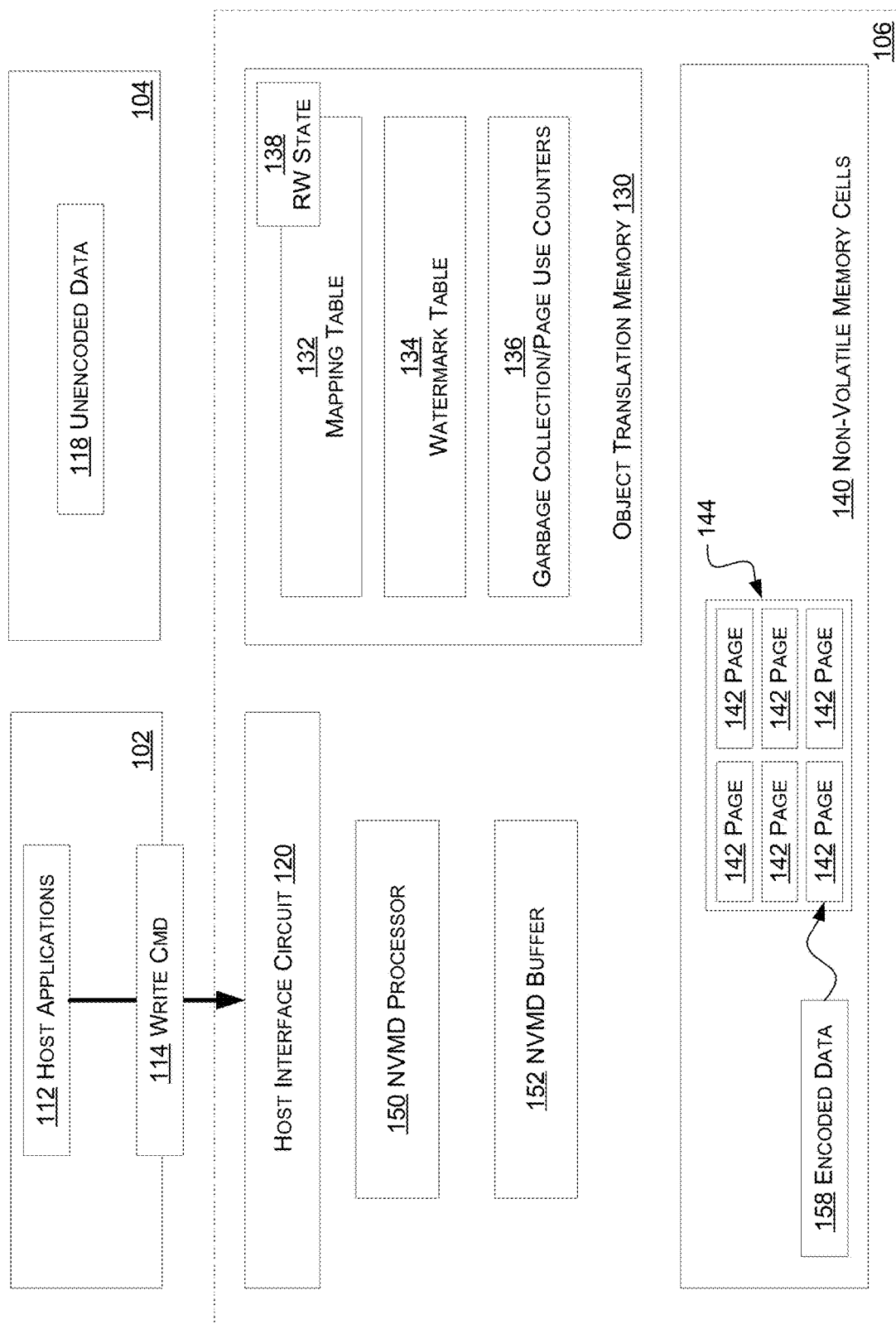
FIG. 1 is a block diagram of an example embodiment of a system in accordance with the disclosed subject matter.

Various example embodiments will be described more fully hereinafter with reference to the accompanying drawings, in which some example embodiments are shown. The present disclosed subject matter may, however, be embodied in many different forms and should not be construed as limited to the example embodiments set forth herein. Rather, these example embodiments are provided so that this disclosure will be thorough and complete, and will fully convey the scope of the present disclosed subject matter to those skilled in the art. In the drawings, the sizes and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on", "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, and so on may be used herein to describe various elements, components, regions, layers and/or sections, these elements, components, regions, layers and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present disclosed subject matter.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosed subject matter.

Unless otherwise defined, all terms (including technical and scientific terms) used herein have the same meaning as commonly understood by one of ordinary skill in the art to which this disclosed subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

FIG. 1 is a block diagram of an example embodiment of a system 100 in accordance with the disclosed subject matter. In various embodiments, the system 100 may include a computing device, such as, for example, a laptop, desktop, workstation, personal digital assistant, smartphone, tablet, and other appropriate computers, and so on or a virtual machine or virtual computing device thereof.

In one embodiment, the system 100 may include a processor 102 configured to execute instructions, and more specifically in this case issue memory access commands (e.g., read, write, etc.). In the illustrated embodiment, the processor 102 may execute one or more host applications 112 or software programs. In such an embodiment, the host applications 112 may access the data described herein. Specifically, in the illustrated embodiment, the host application 112 or processor 102 may transmit a write command 114 to the non-volatile memory device (NVMD) 106.

In the illustrated embodiment, the system 100 may include a non-volatile memory device (NVMD) 106, such as, for example, a flash drive, a solid state drive (SSD), etc. Although, it is understood that the above are merely a few illustrative examples to which the disclosed subject matter is not limited.

In the illustrated embodiment, the NVMD 106 may include a storage device that requires memory cells 140, pages 142, and/or blocks 144 to be erased or reset to a known value before being re-written. In some instances (e.g., magnetic memories, hard drive disks (HDDs), etc.) data may be written and then re-written over and over again without the need for an intervening maintenance operation. When data is changed on such a disk the series of operations generally occur in the following sequence: an initial writing of data to a memory address, and then a second writing of new data to the same memory address. In these instances stored bits may generally be flipped in both directions or in a bi-directional fashion (e.g., from high to low, and low to high). If the second write operation flips bits in either direction, the storage technology supports this and no special steps need occur.

However, in the illustrated embodiment, the storage device 106 may be based upon a technology in which write operations (or in the parlance of the technology "programs") involve flipping bits in only one direction or a unidirectional fashion (e.g., from high to low). The disadvantage of such a technology is that any future write operations may not "reset" a bit to the un-flipped state (e.g., a low to high write may not be possible). In such an embodiment, the traditional procedure is to have an intermediate operation known as "erase" that resets the stored bits to an initial state (e.g., flips all the bits of the memory address to the high state), before a second or subsequent writing of new data (e.g., flipping the data from high to low) can occur. In such an embodiment, the normal series of operations are: a first write to the memory address, an erase (or reset) to the memory address that places the memory address back in the initial state, and then a second write to the memory address may occur. In this context, the term "erasure-based" refers to a memory or storage device that employs a technology that requires this intervening erase operation. In various embodiments, examples of "erasure-based" storage technologies may include flash, NAND, or SSD devices; although, it is understood that the above are merely a few illustrative examples to which the disclosed subject matter is not limited.

In the illustrated embodiment, the NVMD 106 may ultimately store data in a non-volatile manner in non-volatile memory cells 140. These memory cells 140 may each store a bit of data or multiple bits, depending upon the threshold schemes used. These memory cells 140 may be arranged in pages 142, which may in turn be grouped into blocks 144. In the illustrated embodiment, writes may occur at the page-level, while erase operations may occur at the block-level. It is understood that the above is merely one illustrative example to which the disclosed subject matter is not limited.

In the illustrated embodiment, the processor 102 may issue a write command 114 to the NVMD 106. In such an embodiment, the write command 114 may include a memory address (not shown) and data 118 to be written to the NVMD 106. In various embodiments, the data 118 may be stored, at least temporarily in a volatile memory 104. In the illustrated embodiment, the volatile memory 104 may be included by the system 100, and may include dynamic random access memory (DRAM) or system memory. In another embodiment, the memory 104 may include static RAM (SRAM) and may be included as a cache of the processor 102. It is understood that the above are merely a few illustrative examples to which the disclosed subject matter is not limited.

In the illustrated embodiment, the data 118 may be stored in the typical binary fashion employed by computers or in a format that is generally thought of as unencoded (from the point of view of the NVMD 106). In such an embodiment, each bit of information may be represented by one bit of unencoded data 118. In various embodiments, the unencoded data 118 may be a numerical value represented in mathematical binary form. In another embodiment, the unencoded data 118 may be represented in binary-coded decimal (BCD) format, binary code (e.g., 4-8 bits of ASCII or Unicode text), Gray code, or another format employed by the processor 102 to transfer data. As described below, the unencoded data 118 may differ from the encoded data 158 in that the NVMD 106 may add an extra level of encoding to the unencoded data 118 (e.g., that shown in FIGS. 3a and 3b).

In the illustrated embodiment, the write command 114 may be received by the host interface circuit 120 of the NVMD 106. In such an embodiment, the host interface circuit 120 may be a circuit configured to communicate between the NVMD 106 and the processor 102 via a communications protocol (e.g., serial advanced technology attachment (SATA), etc.).

The NVMD 106 may include a NVMD or internal processor 150 to perform operations related to the NVMD 106. The NVMD 106 may also include a NVMD buffer 152 to temporality store data used by the NVMD processor 150. In some embodiments, the NVMD buffer 152 may include a volatile memory.

In the illustrated embodiment, the write command 114 may be processed by the NVMD processor 150. The write command 114 may include a virtual or logical memory address that needs to be translated to a physical memory address. To do this the NVMD processor 150 may make use of a mapping table 132. The mapping table 132 may be stored by an object or flash translation layer (FTL) or memory 130 that is included by the NVMD 106. In various embodiments, the object translation memory 132 may include a volatile memory. It is understood that the above is merely one illustrative example to which the disclosed subject matter is not limited.

In the illustrated embodiment, the mapping table 132 may include a field that indicates, for each memory address in the mapping table 132, a rewritable (RW) state 138 that is associated with that address. As described above, in the traditional erasure-based storage technology, every write operation must be followed by an erase operation before new data can be written (re-written) to the same memory address. However, in the illustrated embodiment, this erase step or operation may be avoided or at least delayed, and subsequent re-writes to the same address may be performed in certain circumstances. The rewritable state 138 may indicate whether or not the erase step must or is likely to be performed before a new write to the memory address can occur.

FIG. 2 is a block diagram of an example embodiment of a mapping table or data structure 200 in accordance with the disclosed subject matter. In various embodiments, the data structure 200 may be included in a single table, as shown. In another embodiment, the data structure 200 may be included in multiple tables.

In the illustrated embodiment, the mapping table 200 may include three columns: logical page address (LPA) 292, physical page address (PPA) 294, and rewritable status 296. In the illustrated embodiment, each memory address is represented by a page address. In such an embodiment, the write command may have included a page-level memory address. In another embodiment, the NVMD processor may have already translated a lower level (e.g., byte-level) memory address to a page-level memory address.

In the illustrated embodiment, six rows are shown (rows 201, 202, 203, 204, 205, and 206). However, it is understood that the mapping table 200 may include any number of rows or entries. It is understood that the above is merely one illustrative example to which the disclosed subject matter is not limited. Likewise, it is understood that the addresses shown are merely illustrative examples to which the disclosed subject matter is not limited.

In such an embodiment, the NVMD processor may use the mapping table 200 to convert the logical or virtual address given in the write command to a physical address where the data may actually be stored. However, before the NVMD processor writes the data to the physical address, the NVMD processor may check to see if the physical address is capable of being written to.

In a traditional erasure-based scheme each physical address was assigned one of the two general states: free/unwritten, or previously-written-to. In various embodiments, the "previously-written-to" state was frequently divided in to in-use or valid, or not-in-use or invalid. If an address was marked as free, data could be written to it without concern. If the address was marked as previously-written-to, the NVMD processor had to make a decision. Either the NVMD processor could write the data to another, free address (and change the mapping table accordingly), or the NVMD processor could cause the address to be erased (setting the address as "free"), and then the new data could be written into the now free address.

In the illustrated embodiment, the each physical address may be associated with one of at least three (four shown) rewritable states: free or un-written, rewritable or Valid-I, and potentially-rewritable. In the illustrated embodiment, the potentially-rewritable state may be sub-divided into Valid-II and Invalid. In the illustrated embodiment, the Valid-I and Valid-II states indicate that the data stored in the respective memory address is still being used by the host processor or CPU. Whereas, the Invalid state indicates that the data is no longer being used by the host processor or CPU. In another embodiment, the rewriteable states may include an Invalid-I state (that indicates the data is unused but rewriteable) and an Invalid-II state (that indicates the data is unused and is only potentially-rewriteable), similarly to the Valid-I and Valid-II states. It is understood that the above are merely a few illustrative examples to which the disclosed subject matter is not limited.

Returning to FIG. 1, in this initial example the mapping table 132 may return the physical address and a rewritable state 138 that indicates that the address has not been written to (e.g., un-written or free). In such an embodiment, the NVMD processor 150 may proceed to write the data, or more specifically the information included in the unencoded data 118, to the physical address.

In the illustrated embodiment, the NVMD processor 150 may convert the unencoded data 118 to a non-traditional encoding scheme (the encoded data 158), prior to storing it (or the information the unencoded data 1118 includes) to the non-volatile memory cells 140 or page 142. In the illustrated embodiment, the encoded data 158 may be encoded in such a way that it takes up more space within the memory cells 140, but it allows for greater re-writ ability (without the intervening erase operation) than if it had been stored in the unencoded data 118's traditional format.

As described above, in erasure-based storage technologies bits may often only be or flipped in one direction (e.g., from high to low) without an expensive operation to reset the bits the other way (e.g., from low back to high). In the illustrated embodiment, the encoded data 158 may be encoded using a scheme in which the values or information stored in the encoded data 158 may be changed multiple times, while still adhering to the limitation imposed by unidirectional changes in the cell 140s' voltage thresholds (e.g., from high to low). In such an embodiment, number of erase operations may be reduced (as two or more writes may occur between erasures instead of only one). Therefore, the overall response time and processing efficiencies of the NVDM 106 may be increased. Even if the storage capabilities may be decreased. It is understood that while unidirectional cell voltage changes are discussed as an embodiment in which the disclosed subject matter is useful, the disclosed subject matter is not limited to technologies with that limitation.

FIG. 3a is a diagram of an example embodiment of an encoding scheme 300 in accordance with the disclosed subject matter. In the illustrated embodiment, the encoding scheme 300 may show various (e.g., four) numerical values of information that may be stored in the NVMD. In the illustrated embodiment, the encoding scheme 300 may also show various (e.g., eight) possible ways the numerical values may be encoded (i.e. symbols). It is understood that the above is merely one illustrative example to which the disclosed subject matter is not limited.

The encoding scheme 300 shows three states or times in which a group of memory cells (e.g., three cells) may be written to or altered by the NVMD processor. In the first state 301 the cells may be erased or reset to their highest potential state. In the illustrated embodiment, that state is '111' or in decimal notation the numerical value 3. Traditionally, the plain binary encoding scheme would have stored the numerical value 3 using 2-bits as '11'. However, as described above, the disclosed subject matter may trade storage space for re-writ ability and employ 3-bits to store the numerical value 3.

The second state or time 302 shows all the possible values that may be stored by the memory cells after an initial write operation has been performed. As 2-bits of traditional binary information is being stored, the memory cells may store decimal values 3, 2, 1, or 0 (shown in the middle block of each possible storage option). Traditionally, these would have been stored as the unencoded 2-bit values 11, 10, 01, or 00, respectively (shown in the right block of each possible storage option). However, in the illustrated embodiment, the encoded symbols employ 3-bits per value and the numerical value or information written to the cells are stored as the symbols 111, 110, 101, or 011, respectively (shown in the left block of each possible storage option).

The third state or time 303 shows all the possible numerical values and encoded symbols that may be stored by the memory cells after a second write operation has been performed. Immediately one will note that a second write operation is possible without the need for an intervening erase operation. Traditionally, once the second state 302 occurred an erase operation was required to reset the memory cells back to the first state 301 (or its traditional unencoded equivalent).

In the illustrated embodiment, each of the values written in the second state 302 may be re-written to a new value without flipping any bits in a way that is prohibitive given the erasure-based storage technology (e.g., from low to high). For example, if the value 3 (111) was stored during the second state 302, the third state becomes a simple repeat of the transition from the first state 301 to the second state 302. The memory cells may be re-written to 111, 110, 101, or 011. If the value 2 (110) was stored during the second state 302, during the third state 303 the values 110 (2), 100 (0), 010 (1), or 000 (3) may be written without an intervening erase operation. If the value 1 (101) was stored during the second state 302, during the third state 303 the values 101 (1), 100 (0), 001 (2), or 000 (3) may be written without an intervening erase operation. If the value 0 (011) was stored during the second state 302, during the third state 303 the values 011 (0), 010 (1), 001 (2), or 000 (3) may be written without an intervening erase operation. It is understood that the above are merely a few illustrative examples to which the disclosed subject matter is not limited.

In the illustrated embodiment, the encoding scheme 300 may employ 8 different potential encodings or symbols to represent 4 numerical values. Decimal 3 may be encoded as either 111 or 000. Decimal 2 may be encoded as either 110 or 001. Decimal 1 may be encoded as either 101 or 010. Decimal 0 may be encoded as either 011 or 100.

Also, one will note that the encodings or symbols in group 312 (i.e., 111, 110, 101, and 001) may be re-written again without the need for an intervening erase operation (as illustrated by the transition from state 302 to 303). Whereas the encodings or symbols in group 314 (i.e., 100, 010, 001, and 000) do not immediately display this flexibility.

FIG. 3b is a diagram of an example embodiment of an encoding scheme 300 in accordance with the disclosed subject matter. FIG. 3b continues the possible encoding options or possibilities for one example embodiment to a fourth state 304. In such an embodiment, a second re-write operation (a third write operation) may be performed or may be attempted.

If a second re-write operation is attempted and the memory cells are encoded according to the group 312, the same encoding transitions displaced between states 302 and 303 may be performed. The arrows displaying the encoding transitions between states 303 and 304 are not shown as they are the same as between 302 and 303 (as the initial encodings are the same) and the arrows would obscure the point of FIG. 3b. As long as the memory cells are encoded with the symbols in group 312, the memory cells may be written from any initial decimal value to any other decimal value (as encoded in groups 312 or 314). In such an embodiment, when a memory address includes cells encoded according to group 312 the memory address may be considered rewritable.

Conversely, when the memory cells are encode with one of the symbols in group 314 the ability to re-write the cells becomes more limited. As illustrated by FIG. 3b, most of the encodings in group 314 may only be re-written to one of two values. The 000 encoding may only be re-written to one value, itself (000). The memory cells, in state 303, where already set to symbols in which most of the bits were flipped (i.e., from high to low) and therefore the symbols cannot be changed to many of the other symbols without an intervening erase operation (resetting the cells to 111). In such an embodiment, when a memory address includes cells encoded according to group 314 the memory address may be considered only potentially-rewritable.

In various embodiments, a memory address that includes memory cells that are only in the first state 301 may be associated with a rewritable state of Free. In such an embodiment, a memory address that includes memory cells that are encoded with the group 312 may be associated with a rewritable state of rewritable, Valid-I or Invalid-I (according to the embodiment and whether the memory address is currently active or in use by the processor). In such an embodiment, a memory address that includes memory cells that are encoded with the group 314 may be associated with a rewritable state of potentially-rewritable, Valid-II, Invalid, or Invalid-II (according to the embodiment and whether the memory address is currently active or in use by the processor). It is understood that the above are merely a few illustrative examples to which the disclosed subject matter is not limited.

Returning to FIG. 1, in the illustrated embodiment, the NVMD 106 may receive a second write command 114. This write command 114 may be to the same memory address as the first write command 114. Traditionally, as described above, the NVMD processor 150 would have selected a new physical address to write to and/or would have erased the contents of the old physical address. However, in the illustrated embodiment, the NVMD processor 150 may check the mapping table 132 to convert the logical address to a physical address, and to determine the rewritable state 138 of the physical address. In this instance, the rewriteable state 138 will be one that indicates the memory address is able to be re-written without an intervening erase operation (e.g., Valid-I, etc.). The first write operation would have left the memory cells used to store the encoded data 158 in one of the rewritable encodings or symbols shown in group 312 of FIG. 3a.

The NVMD processor 150 will encode the unencoded data 118 to the proper encoded data 158 (as shown in FIG. 3a by the transition from the second state 302 to the third state 303). The new encoded data 158 may be stored in the memory cells 140. The NVMD processor 150 may change the rewritable state 138 to reflect the new state of the encoded data 158. In some embodiments, once any transition from the second state 302 to the third state 303 occurs, the rewriteable state 138 may be changed to indicate that the memory address is only potentially-rewriteable (e.g., Valid-II, etc.), as the data may be encoded using the encodings of groups 312 and/or 314. In another embodiment, the NVMD processor 150 may more closely monitor what encodings were used to create the encoded data 158 and mark the rewritable state 138 as rewritable (e.g., Valid-I) if only the group 312 encodings were used, or as potentially-rewritable (e.g., Valid-II) if any of the group 314 encodings were used. It is understood that the above are merely a few illustrative examples to which the disclosed subject matter is not limited.

In this example embodiment, the second write command 114 will (for illustrative purposes) cause the rewritable state to be potentially-rewriteable (e.g., Valid-II). It is understood that the above is merely one illustrative example to which the disclosed subject matter is not limited.

Eventually, a third write command 114 to the same memory address may be issued. Traditionally, as described above, the NVMD processor 150 would have selected a new physical address to write to and/or would have erased the contents of the old physical address. However, in the illustrated embodiment, the NVMD processor 150 may check the mapping table 132 to convert the logical address to a physical address, and to determine the rewritable state 138 of the physical address. In this instance, the rewriteable state 138 will be one that indicates the memory address is only potentially able to be re-written without an intervening erase operation (e.g., Valid-II, etc.). The second write operation may have left the encoded data 158 with one of the symbols shown in group 314 of FIG. 3a.

In the illustrated embodiment, the NVMD processor 150 may determine what the appropriate encoding of the unencoded data 118 is, and if that new encoded data 158 is one that can be reached from the encoding symbols used by the second write operation's encoded data 158. As described above, this may be seen in FIG. 3b in the transition from the third state 303 to the fourth state 304. As the encodings of group 314 may only transition to two or less numerical values, it is possible that a subsequent write command (in this case the third write command 114) may include numerical values that are unobtainable from the given symbols used in the existing encoded data 158.

In some embodiments, the NVMD processor 150 may simply compare the new encoded data 158 to the old encoded data 158 and determine if the transition is possible (e.g., can all the needed bits be flipped?). If it is possible, the new encoded data 158 may be written to the physical memory address. If it is not possible, the new encoded data 158 may be written to a new physical memory address. The mapping table 132 may be changed to point to the new physical memory address, and the old physical memory address may be marked as invalid and available for erasure.

However, in the illustrated embodiment, the NVMD 106 may include a watermark table 134 (stored in the memory 130). The watermark table 134 may include, for each used physical memory address or for each potentially-rewritable memory address, a watermark that indicates the degree that the potentially-rewritable memory address is actually rewritable. In some embodiments, this watermark may include a number of flip-able bits or is stored at the physical address.

The NVMD processor 150 may determine the number of bits in the old encoded data 158 that must be flipped to create the new encoded data 158 and compare that to the address's watermark in the watermark table 134. For example, if the new encoded data 158 would require that 10 bits of the old encoded data 158 be flipped and the target memory address only has 9 bits that may be flipped (without an erase operation), the NVMD processor 150 may quickly determine that the memory address is not actually rewritable. Conversely, if the target memory address had 10 or more flappable bits, the NVMD processor 150 may perform a more detailed analysis, as described above. The processor determines the number of 1s in the new data and compares it with watermark in the watermark table. If the number of 1s in the new data is 10, and the watermark shows that the number of 1s (number of flappable bits) in the old data is 9, we can quickly say the old data cannot be replaced by the new data. Conversely, . . .

FIG. 4 is a block diagram of an example embodiment of a watermark table or data structure 400 in accordance with the disclosed subject matter. In various embodiments, the data structure 400 may be included in a separate table, as shown. In another embodiment, the data structure 400 may be included as part of another table (e.g., the mapping table).

In the illustrated embodiment, the watermark table 400 may include two columns: physical page address (PPA) 494, and number of flip-able bits 496. In the illustrated embodiment, each memory address is represented by a page address. In such an embodiment, the write command may have included a page-level memory address. In another embodiment, the NVMD processor may have already translated a lower level (e.g., byte-level) memory address to page-level memory address.

In the illustrated embodiment, six rows are shown (rows 401, 402, 403, 404, 405, and 406) for each of the memory addresses shown in the mapping table 200 of FIG. 2. However, it is understood that the watermark table 400 may include any number of rows or entries. In another embodiment, only memory addresses that are associated with the "potentially rewritable" (e.g., Valid-II or Invalid) rewritable state may be included. Using the example shown in FIG. 2, this embodiment would include the rows 403, 404, and 406 as those addresses are associated with the rewritable states Valid-II and Invalid. It is understood that the above is merely one illustrative example to which the disclosed subject matter is not limited.

Returning to FIG. 1, despite the illustrated embodiment's ability to perform multiple writes (to the same address) without intervening erase operations, garbage collection (GC) operations may still be desirable. In such an embodiment, the NVMD processor 150 may perform garbage collection in a manner that takes into account the rewritable state 138 of the various memory addresses.

In various embodiments, write operations may be performed at the page-level, that is, pages 142 are written to individually. But, erase operations and garbage collection operations (which often involve erasures) may occur at the block-level, that is, an entire block 144 may be erased at once. It is understood that the above is merely one illustrative example to which the disclosed subject matter is not limited.

In the illustrated embodiment, the NVMD processor 150 may maintain a number of garbage collection or page-use counters 136 (stored in the memory 130) to help determine which blocks 144 should be erased and which blocks 144 should be kept. In such an embodiment, the NVMD processor 150 may count the number of Valid or in-use pages 142 per block 144. In the illustrated embodiment, the NVMD processor 150 may count each Valid-I or rewritable page twice, and each Valid-II or potentially-rewritable page only once. The sum of these page counts may be taken for each block 144. The block 144 with the lowest counter 136 value or a counter 136 with a value below a threshold value may then be targeted for garbage collection. In such an embodiment, pages 142 that may easily be rewritten may be less likely to be collected or erased. For example, Valid-I pages may be less likely to be erased than Valid-II or Invalid pages.

In one embodiment, the counting of potentially-rewritable or rewritable pages 142 may not be limited to Valid pages 142 but may also be extended to Invalid pages 142. In such an embodiment, Invalid pages 142 may be given a lower count value. In yet another embodiment, a different counting scheme may be employed (e.g., one based upon the watermark values, etc.). It is understood that the above are merely a few illustrative examples to which the disclosed subject matter is not limited.

Figure 5:
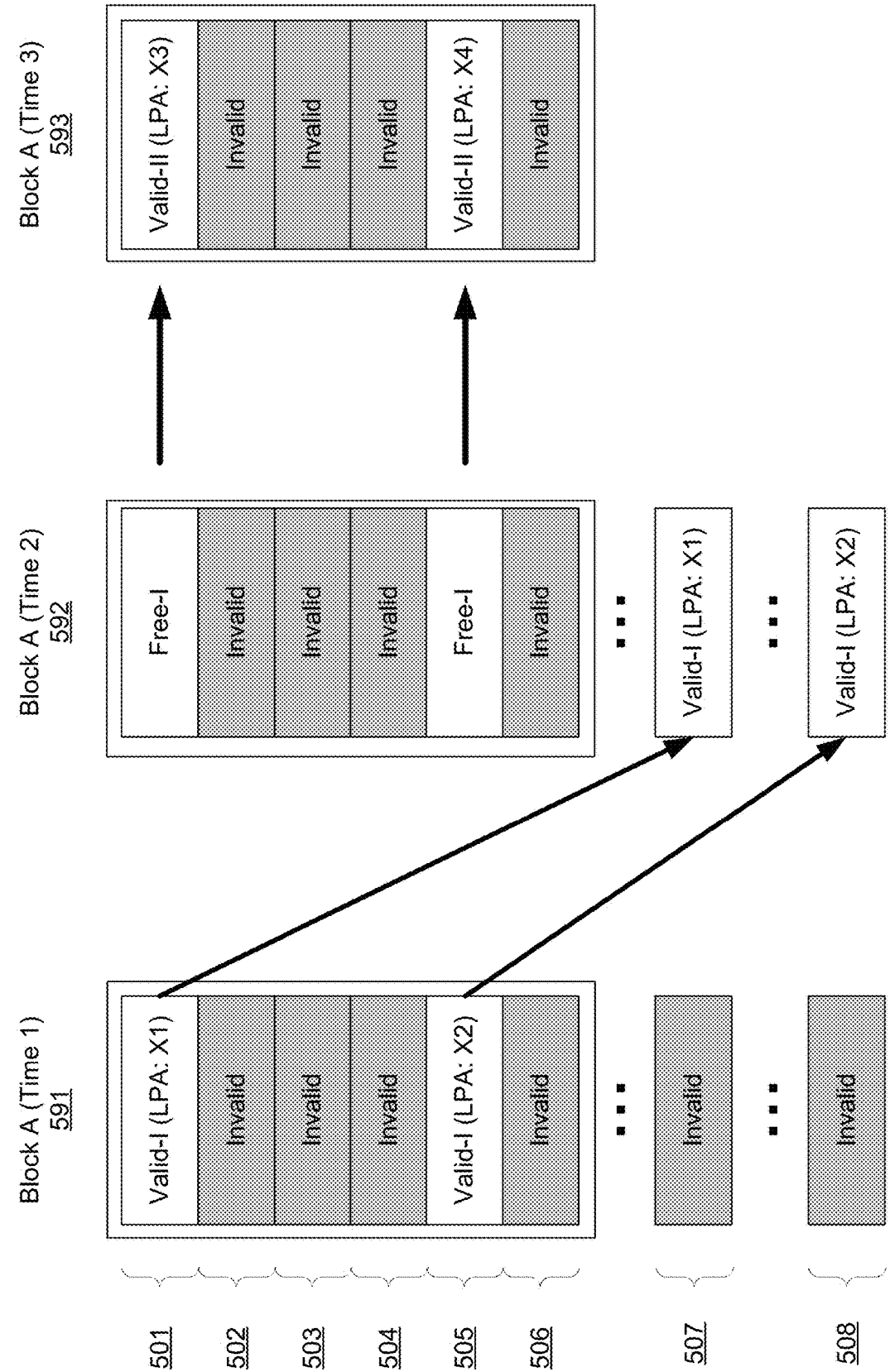
FIG. 5 is a block diagram of an example embodiment of a data structure in accordance with the disclosed subject matter.

FIG. 5 is a block diagram of an example embodiment of a portion of the non-volatile memory or data structure 500 in accordance with the disclosed subject matter. In various embodiments, the data structure 500 shows how garbage collection may operate.

As described above, in various embodiments, an Invalid page may include stale data or information. As described above, in some embodiments, the NVMD may track whether or not the Invalid pages are capable of being re-written without the need for erasure (e.g., Invalid-I, Invalid-II, etc.).

Traditionally, garbage collection occurs when a block or group of pages is selected for erasure. In such an embodiment, this block may be referred to as a victim block. If the victim block includes valid data, the NVMD's processor may move that data to pages or memory addresses outside of the victim block, and then erase the victim block. These newly moved pages, in the traditional systems, have to be moved to erased or Free pages. This lowers the efficiency of the garbage collection process.

In various embodiments, if the traditional form of garbage collection was to be combined with the rewritable encoding scheme described herein, the opportunity to reuse or write Valid-I pages (or even some Valid-II pages) may be lost, as all pages in a victim block are traditionally erased during garbage collection. In some embodiments, it may be difficult to find victim blocks without Valid-I or rewriteable pages. For example pages that include cold data (i.e., data written infrequently) may often include only Valid-I or Invalid-I data. Conversely, hot data (i.e., data accessed frequently) may include both Valid I and Valid-II pages. In the illustrated embodiment, a form of partial garbage collection may be employed to make use of the ability for the encoded data to be rewritten without requiring an intervening erase operation.

In the illustrated embodiment, the data structure 500 includes three time periods 591, 592, and 593. The first time period 591 may be a first state when the garbage collection process has begun. The second time period 592 may be a second state when the garbage collection process has completed. The third time period 593 may be a third state when new information has been written to the NVMD.

In the illustrated embodiment, the data structure 500 may include a Block A that includes the memory pages or addresses 501, 502, 503, 504, 505, and 506; although, it is understood that the number of pages in a block is merely an illustrative example to which the disclosed subject matter is not limited. The data structure 500 may also include memory pages or addresses 507 and 508 which are not included or are outside of the Block A (e.g., in an unillustrated Block B or C, etc.).

In such an embodiment at time 591, the pages 501 and 505 may include data or information associated with the rewriteable state Valid-I. Pages 502, 503, 504, 506, 507, and 508 may all include data or information associated with the rewriteable state Invalid. In various embodiments, the NVMD may or may not keep track of whether Invalid pages may or may not be rewritten without erasure (e.g., Invalid-I, Invalid-II, etc.).

In such an embodiment, the NVMD (e.g., the internal processor) may select Block A as the victim block. In one embodiment, it may check or determine if any Valid-I pages are included in the victim block. If not, the NVMD may simply proceed with the step of erasing the whole block. However, in the illustrated embodiment, Block A does include the two Valid-I pages 501 and 505 (associated with LPAs X1 and X2, respectively).

In such an embodiment, the NVMD may move the information stored in pages 501 and 505 to pages outside the victim block (Block A). In the illustrated embodiment, the information in page 501 may be moved to page 507, and the information in page 505 may be moved to page 508. In the illustrated embodiment, the pages 507 and 508 may already be erased or may be erased prior to being written to with the moved information. In such an embodiment, the mapping table may indicate that the rewritable states of pages 507 and 508 are both Valid-I. Also, their LPAs may be remapped or re-associated with the new PPAs of pages 507 and 508.

In the illustrated embodiment, the pages 501 and 505 may be marked as Free. Traditionally, these pages would be erased. However, as the encoding scheme described herein (or a similar one) allows these pages to be rewritten without an intervening erasure operation, that step may be skipped.

In the illustrated embodiment, the NVMD may mark them as Free but may employ a variation of the Free state (e.g., Free-I) that indicates that page has been written to at least once without the need for an erase operation. This Free-I rewritable state may be similar to the Valid-I or Invalid-I states. In some embodiments, the Free-I state may be equivalent to the Invalid-I state. In another embodiment, Free-I and Invalid-I may have different meanings, but a similar rewritable ability. It is understood that the above are merely a few illustrative examples to which the disclosed subject matter is not limited.

Figure 6:
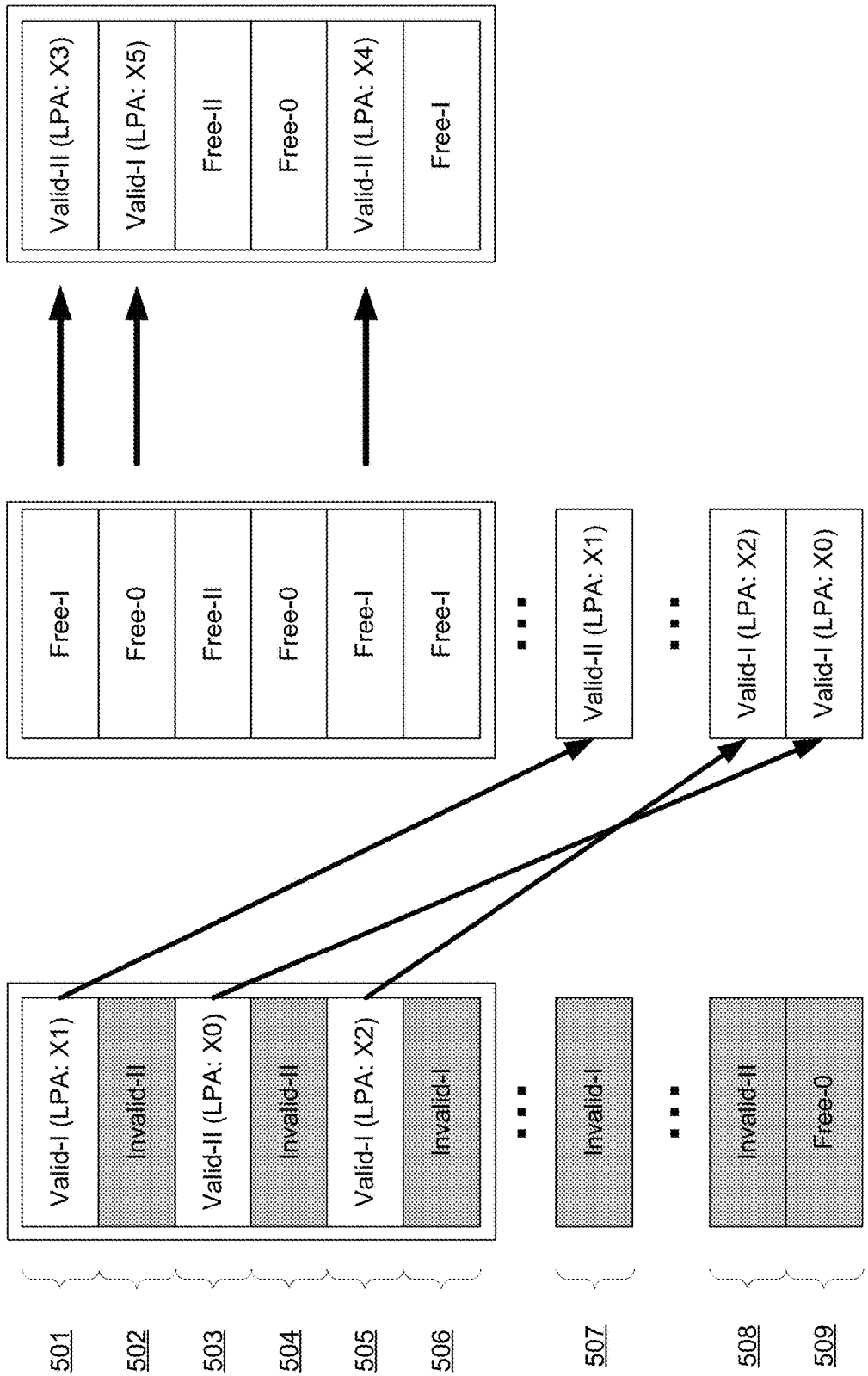
FIG. 6 is a block diagram of an example embodiment of a data structure in accordance with the disclosed subject matter.

In the illustrated embodiment, the pages may simply be left as Invalid (e.g., pages 502, 503, 504, 506, etc.). Time 592 shows the state of the memory pages after the partial garbage collection process has completed. However, in some embodiments, the other pages (e.g., pages 502, 503, 504, and 506) may be erased. The data structure of FIG. 6 illustrates a different embodiment. It is understood that the above are merely a few illustrative examples to which the disclosed subject matter is not limited.

In various embodiments, new data may be written to the NVMD. As described above, the new data or information may come into the NVMD in an unencoded format. It is understood that the term "unencoded" may be relative term compared to the encoding scheme illustrated in FIGS. 3a & 3b, and may indicate that the data is merely not encoded according to the rewritable encoding scheme described herein. In various embodiments, the information may be encoded in a traditional scheme and then re-encoded to the rewritable encoding scheme (e.g., that of FIGS. 3a & 3b, as described above) before being stored in the NVMD.

In the illustrated embodiment, a first piece of new information (associated with LPA X3) may be written into page 501. The new information may be encoded according to the rewritable format. However, as the page 501 was previously written to and not erased, the rewritable state of the new information may be Valid-II or merely potentially rewritable (as opposed to fully rewritable). The same may happen with page 505 and the LPA X4. Time 593 illustrates the state of Block A after new information has been written to it (note: pages 507 and 508 have been removed from the illustration in order to simply the figure).

In various embodiments, the selection of the victim block (e.g., Block A) may include a Selection phase or step of the garbage collection. In another embodiment, the determination of the existence of rewritable pages may include a Determination or Validation phase or step of the garbage collection. In some embodiments, the removal of the rewritable pages may include a Block Cleanup phase or step of the garbage collection. In some embodiments, the erasure of any non-rewritable pages may include an Erasure phase or step of the garbage collection.

FIG. 6 is a block diagram of an example embodiment of a portion of the NVMD or data structure 600 in accordance with the disclosed subject matter. In various embodiments, the data structure 600 shows how garbage collection may operate.

In the illustrated embodiment, the data structure 600 includes three time periods 691, 692, and 693. The first time period 691 may be a first state when the garbage collection process has begun. The second time period 692 may be a second state when the garbage collection process has completed. The third time period 693 may be a third state when new information has been written to the NVMD.

In the illustrated embodiment, the data structure 600 may include a Block A that includes the memory pages or addresses 501, 502, 503, 504, 505, and 506; although, it is understood that the number of pages in a block is merely an illustrative example to which the disclosed subject matter is not limited. The data structure 600 may also include memory pages or addresses 507, 508, and 509 which are not included or are outside of the Block A (e.g., in an unillustrated Block B or C, etc.).

In such an embodiment at time 691, the pages 501 and 505 may include data or information associated with the rewriteable state Valid-I. Page 503 may include data or information associated with the rewriteable state Valid-II. Pages 502, 504, 506, 507, and 508 may all include data or information associated with the rewriteable state Invalid. In the illustrated embodiment, the NVMD may keep track of whether Invalid pages may or may not be rewritten without erasure (e.g., Invalid-I, Invalid-II, etc.).

In such an embodiment, the NVMD (e.g., the internal processor) may select Block A as the victim block. In one embodiment, it may check or determine if any Valid-I pages are included in the victim block. If not, the NVMD may simply proceed with the step of moving any valid data (e.g., Valid-II data) and then erasing the whole block. However, in the illustrated embodiment, Block A does include the two Valid-I pages 501 and 505 (associated with LPAs X1 and X2, respectively).

In the illustrated embodiment, the NVMD may move the information from page 501 to page 507. In this instance page 507 may be associated with an Invalid-I rewritable state. As such, the writing of the LPA X1 data in page 507 may turn it to the Valid-II rewritable state.

Conversely, the information from page 505 may be moved to page 508. In the illustrated embodiment, page 508 may be associated with the rewritable state Invalid-II, meaning that the data may be rewritable without an intervening erasure operation but may be not. In the illustrated embodiment, page 508 may be erased prior to the LPA X2 information being written to it. In such an embodiment, the rewritable state of page 508 may be Valid-I. Had the data allowed for the data to be written without an intervening erase, the erasure operation could have been skipped and the rewritable state could have been set to Valid-II.

In another unillustrated embodiment, an Invalid-II block (again not illustrated) may be re-written by the data of a Valid-I page (e.g., Block 501 or 505). In such an embodiment, if the Invalid-II block was able to be re-written with the information from the Valid-I block, the state of the block may be changed from Invalid-II page to Valid-II. It is understood that the above are merely a few illustrative examples to which the disclosed subject matter is not limited.

In the illustrated embodiment, the entire victim block (Block A) may be cleared or freed during the garbage collection procedure. (This is opposed to the embodiment of FIG. 5 in which the victim block only experienced partial garbage collection.) In such an embodiment, the information stored in page 503 (Valid-II and LPA X0) may be moved from the victim block. The information may be moved to page 509 that has a state of Free-0.

In the illustrated embodiment, the NVMD may include two or more Free states. A Free state may indicate that data may be written to a particular page without the need for an immediate erasure. The rewritable state Free-0 may indicate that the page is in a pristine state, un-written, or recently erased. The rewritable state Free-I may indicate that the page has been written to at least once, but may be rewritten to without the need for an intervening erase operation (similar to Valid-I or Invalid-I). It is understood that the above are merely a few illustrative examples to which the disclosed subject matter is not limited.

In such an embodiment, the page 509 may be associated with the rewritable state of Free-0 and may be written to immediately. Therefore, after the LPA X0 information has been encoded into page 509, it may have a rewritable state of Valid-I.

In some embodiments, the entire Block A may physically be erased and all pages 502, etc.) may be reset to the Free-0 state. In another embodiment, a quick freeing of the Block A may occur without the intervening Erasure step. In such an embodiment, the pages may be marked a Free (or a variant thereof) but may not be erased. This may occur if the garbage collection determines that a contiguous and free block of memory is advantageous but the step of erasing the information can be skipped. In such an embodiment, not all pages may be set to the Free-0 state.

In the illustrated embodiment, the Invalid pages of Block A (e.g., pages 502, 504, and 506) may be re-categorized as Free. In some embodiments, pages that are associated with a rewritable state that allows for non-erasure (e.g., Invalid-I such as page 506) may be re-categorized as Free-I and not erased. Whereas pages that are associated with rewritable states that require or may require an intervening erasure (e.g., Invalid-II such as pages 502 and 504) may be erased and then marked as Free-0. Time 692 shows the state of the memory pages after the garbage collection process.

Time 693 illustrates the state of the memory pages after new information has been written to Block A (again pages outside Block A are no longer shown). Pages associated with the Free-I state (e.g., pages 501 and 505) may store information that is then marked or associated with the rewritable state Valid-II. Conversely, pages associated with the Free-0 state (e.g., page 502) may store information that is then marked or associated with the rewritable state Valid-I. It is understood that the above are merely a few illustrative examples to which the disclosed subject matter is not limited.

In various embodiments, the garbage collection process, either full or partial may be employed with any dual-program flash memory, and is not limited to the specific encoding scheme described above. Wherein the term "dual-program" refers to a erasure-based memory than can be written to, at the same physical address, at least twice without an intervening erase operation.

Likewise, the garbage collection process described herein may make more efficient use of the NVMD space and improve the garbage collection efficiency. Part of that improved efficiency may include invoking the full garbage collection less frequently, as a partial garbage collection may often be sufficient. It is understood that the above are merely a few illustrative examples to which the disclosed subject matter is not limited.

Figure 7:
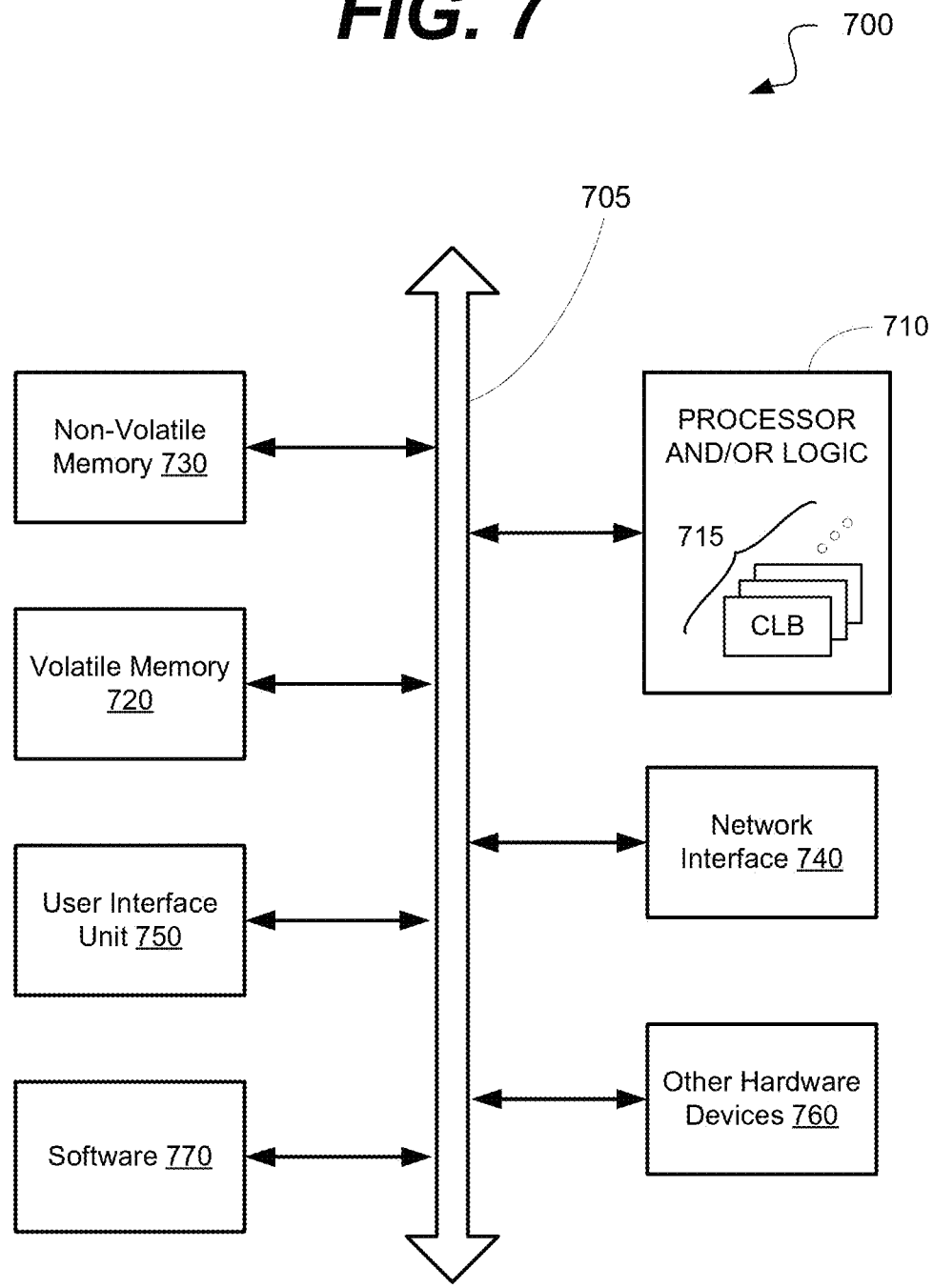
FIG. 7 is a schematic block diagram of an information processing system that may include devices formed according to principles of the disclosed subject matter.

FIG. 7 is a schematic block diagram of an information processing system 700, which may include semiconductor devices formed according to principles of the disclosed subject matter.

Referring to FIG. 7, an information processing system 700 may include one or more of devices constructed according to the principles of the disclosed subject matter. In another embodiment, the information processing system 700 may employ or execute one or more techniques according to the principles of the disclosed subject matter.

In various embodiments, the information processing system 700 may include a computing device, such as, for example, a laptop, desktop, workstation, server, blade server, personal digital assistant, smartphone, tablet, and other appropriate computers, etc. or a virtual machine or virtual computing device thereof. In various embodiments, the information processing system 700 may be used by a user (not shown).

The information processing system 700 according to the disclosed subject matter may further include a central processing unit (CPU), logic, or processor 710. In some embodiments, the processor 710 may include one or more functional unit blocks (FUBs) or combinational logic blocks (CLBs) 715. In such an embodiment, a combinational logic block may include various Boolean logic operations (e.g., NAND, NOR, NOT, XOR, etc.), stabilizing logic devices (e.g., flip-flops, latches, etc.), other logic devices, or a combination thereof. These combinational logic operations may be configured in simple or complex fashion to process input signals to achieve a desired result. It is understood that while a few illustrative examples of synchronous combinational logic operations are described, the disclosed subject matter is not so limited and may include asynchronous operations, or a mixture thereof. In one embodiment, the combinational logic operations may comprise a plurality of complementary metal oxide semiconductors (CMOS) transistors. In various embodiments, these CMOS transistors may be arranged into gates that perform the logical operations; although it is understood that other technologies may be used and are within the scope of the disclosed subject matter.

The information processing system 700 according to the disclosed subject matter may further include a volatile memory 720 (e.g., a Random Access Memory (RAM), etc.). The information processing system 700 according to the disclosed subject matter may further include a non-volatile memory 730 (e.g., a hard drive, an optical memory, a NAND or Flash memory, etc.). In some embodiments, either the volatile memory 720, the non-volatile memory 730, or a combination or portions thereof may be referred to as a "storage medium". In various embodiments, the volatile memory 720 and/or the non-volatile memory 730 may be configured to store data in a semi-permanent or substantially permanent form.

In various embodiments, the information processing system 700 may include one or more network interfaces 740 configured to allow the information processing system 700 to be part of and communicate via a communications network. Examples of a Wi-Fi protocol may include, but are not limited to, Institute of Electrical and Electronics Engineers (IEEE) 802.11g, IEEE 802.11n, etc. Examples of a cellular protocol may include, but are not limited to: IEEE 802.16m (a.k.a. Wireless-MAN (Metropolitan Area Network) Advanced), Long Term Evolution (LTE) Advanced), Enhanced Data rates for GSM (Global System for Mobile Communications) Evolution (EDGE), Evolved High-Speed Packet Access (HSPA+), etc. Examples of a wired protocol may include, but are not limited to, IEEE 802.3 (a.k.a. Ethernet), Fibre Channel, Power Line communication (e.g., HomePlug, IEEE 1901, etc.), etc. It is understood that the above are merely a few illustrative examples to which the disclosed subject matter is not limited.

The information processing system 700 according to the disclosed subject matter may further include a user interface unit 750 (e.g., a display adapter, a haptic interface, a human interface device, etc.). In various embodiments, this user interface unit 750 may be configured to either receive input from a user and/or provide output to a user. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

In various embodiments, the information processing system 700 may include one or more other devices or hardware components 760 (e.g., a display or monitor, a keyboard, a mouse, a camera, a fingerprint reader, a video processor, etc.). It is understood that the above are merely a few illustrative examples to which the disclosed subject matter is not limited.

The information processing system 700 according to the disclosed subject matter may further include one or more system buses 705. In such an embodiment, the system bus 705 may be configured to communicatively couple the processor 710, the volatile memory 720, the non-volatile memory 730, the network interface 740, the user interface unit 750, and one or more hardware components 760. Data processed by the processor 710 or data inputted from outside of the non-volatile memory 730 may be stored in either the non-volatile memory 730 or the volatile memory 720.

In various embodiments, the information processing system 700 may include or execute one or more software components 770. In some embodiments, the software components 770 may include an operating system (OS) and/or an application. In some embodiments, the OS may be configured to provide one or more services to an application and manage or act as an intermediary between the application and the various hardware components (e.g., the processor 710, a network interface 740, etc.) of the information processing system 700. In such an embodiment, the information processing system 700 may include one or more native applications, which may be installed locally (e.g., within the non-volatile memory 730, etc.) and configured to be executed directly by the processor 710 and directly interact with the OS. In such an embodiment, the native applications may include pre-compiled machine executable code. In some embodiments, the native applications may include a script interpreter (e.g., C shell (csh), AppleScript, AutoHotkey, etc.) or a virtual execution machine (VM) (e.g., the Java Virtual Machine, the Microsoft Common Language Runtime, etc.) that are configured to translate source or object code into executable code which is then executed by the processor 710.

The semiconductor devices described above may be encapsulated using various packaging techniques. For example, semiconductor devices constructed according to principles of the disclosed subject matter may be encapsulated using any one of a package on package (POP) technique, a ball grid arrays (BGAs) technique, a chip scale packages (CSPs) technique, a plastic leaded chip carrier (PLCC) technique, a plastic dual in-line package (PDIP) technique, a die in waffle pack technique, a die in wafer form technique, a chip on board (COB) technique, a ceramic dual in-line package (CERDIP) technique, a plastic metric quad flat package (PMQFP) technique, a plastic quad flat package (PQFP) technique, a small outline package (SOIC) technique, a shrink small outline package (SSOP) technique, a thin small outline package (TSOP) technique, a thin quad flat package (TQFP) technique, a system in package (SIP) technique, a multi-chip package (MCP) technique, a wafer-level fabricated package (WFP) technique, a wafer-level processed stack package (WSP) technique, or other technique as will be known to those skilled in the art.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

In various embodiments, a computer readable medium may include instructions that, when executed, cause a device to perform at least a portion of the method steps. In some embodiments, the computer readable medium may be included in a magnetic medium, optical medium, other medium, or a combination thereof (e.g., CD-ROM, hard drive, a read-only memory, a flash drive, etc.). In such an embodiment, the computer readable medium may be a tangibly and non-transitorily embodied article of manufacture.

While the principles of the disclosed subject matter have been described with reference to example embodiments, it will be apparent to those skilled in the art that various changes and modifications may be made thereto without departing from the spirit and scope of these disclosed concepts. Therefore, it should be understood that the above embodiments are not limiting, but are illustrative only. Thus, the scope of the disclosed concepts are to be determined by the broadest permissible interpretation of the following claims and their equivalents, and should not be restricted or limited by the foregoing description. It is, therefore, to be understood that the appended claims are intended to cover all such modifications and changes as fall within the scope of the embodiments.

What is claimed is:

1. An apparatus comprising:
   a memory to store a mapping table, wherein the mapping table indicates a rewriteable state of a plurality of memory addresses;
   an erasure-based, non-volatile memory configured to store information, at respective memory addresses, in an encoded format, wherein the encoded format includes more bits than the an unencoded version of the information and wherein the encoded format allows the information be over-written, at least once, without an intervening erase operation; and
   a processor configured to perform garbage collection based, at least in part upon, the rewriteable state associated with the respective memory addresses, wherein the processor is configured to, as part of the garbage collection, determine that at least one memory address is associated with an erasure-free rewriteable state.

2. The apparatus of claim 1, wherein the processor is configured to:
   select a victim block of memory addresses; and
   copy the information stored at the at least one memory address to a memory address outside of the victim block.

3. The apparatus of claim 2, wherein the mapping table within the memory is configured to, in response to the copying of the information from the at least one memory address, indicate that the at least one memory address is free.

4. The apparatus of claim 3, wherein the processor is configured to:
   receive a write command, wherein the write command includes information in a format other than the encoded format; and
   store the information, in the encoded format, in at least one of the at least one memory addresses.

5. The apparatus of claim 2, wherein the processor is configured to:

copy the information stored at the at least one memory address to a memory address that is associated with a rewriteable state that does not require an intervening erase operation.

6. The apparatus of claim 2, wherein the processor is configured to:
    select a target memory address based upon the target memory addresses rewriteable state, wherein the processor prefers a target memory address associated with a rewriteable state that does not require an intervening erase operation; and
    copy the information stored at the at least one memory address to the target memory address.

7. The apparatus of claim 2, wherein the processor is configured to:
    erase the memory addresses included within the victim block.

8. The apparatus of claim 1, wherein the processor is configured to:
    select a victim block of memory addresses;
    determine that partial garbage collection may be performed on at least a portion of the victim block;
    marking the portion of the victim block as free, based on the determination that the partial garbage collection may be performed; and
    erasing the entire victim block, based on the determination that the partial garbage collection may be performed.

9. A system comprising:
    a processor configured to transmit memory commands to an erasure-based, non-volatile memory device; and
    the erasure-based, non-volatile memory device is configured to perform, to a single target physical memory address, a first and at least a second write commands without an intervening erase operation,
wherein the erasure-based, non-volatile memory device comprises:
    a non-volatile memory configured to:
        store the information, at respective memory addresses, in an encoded format, wherein the encoded format includes more bits than an unencoded version of the information and wherein the encoded format allows the information to be over written, at least once, without an intervening erase operation, and
        update, as part of performing each write command, a rewritable state associated with a respective physical memory address; and
    an internal processor configured to:
        perform garbage collection based, at least in part upon, the rewriteable state associated with the respective memory addresses, wherein the internal processor is configured to, as part of the garbage collection, determine if the respective memory address is associated with an erasure-free rewriteable state.

10. The system of claim 9, wherein the internal processor is configured to:
    select a victim block of memory addresses; and
    copy the information stored at the at least one memory address to a memory address outside of the victim block.

11. The system of claim 10, wherein the non-volatile memory is configured to, in response to the copying of the information from the victim block's at least one memory address, indicate that the at least one memory address is free.

12. The system of claim 11, wherein the erasure-based, non-volatile memory device is configured to:
    receive a write command, wherein the write command includes information in a format other than the encoded format; and
    store the information, in the encoded format, in at least one of the victim block's at least one memory addresses.

13. The system of claim 10, wherein the erasure-based, non-volatile memory device is configured to:
    copy the information stored at the at least one memory address to a memory address that is associated with a rewriteable state that does not require an intervening erase operation.

14. The system of claim 10, wherein the erasure-based, non-volatile memory device is configured to:
    select a target memory address based upon the target memory addresses rewriteable state, wherein the processor prefers a target memory address associated with a rewriteable state that does not require an intervening erase operation; and
    copy the information stored at the at least one memory address to the target memory address.

15. The system of claim 10, wherein the erasure-based, non-volatile memory device is configured to:
    erase the memory addresses included within the victim block.

16. The system of claim 9, wherein the erasure-based, non-volatile memory device is configured to:
    select a victim block of memory addresses;
    determine that partial garbage collection may be performed on at least a portion of the victim block;
    mark the portion of the victim block as free, based upon the determination that the partial garbage collection may be performed; and
    erase the entire victim block, based upon the determination that the partial garbage collection may be performed.

17. A method comprising:
    storing information, at respective memory addresses within erasure-based, non-volatile memory, in an encoded format, wherein the encoded format includes more bits than the an unencoded version of the information and wherein the encoded format allows the information be over-written, at least once, without an intervening erase operation;
    selecting a victim block of memory addresses to perform at least partial garbage collection upon;
    determining, within the victim block, that at least one memory address is associated with an erasure-free rewriteable state; and
    copying the information stored at the victim block's at least one memory address to a second memory address outside of the victim block.

18. The method of claim 17, wherein the encoded format allows the information be over-written according to a binary tree that dictates that the information may be over-written from a first encoded value to one of either the first encoded value or a predefined, based upon the first encoded value, second encoded value; and
    in response to the copying of the information, indicating that the at least one memory address is free.

19. The method of claim 17, further comprising:
    receiving a write command, wherein the write command includes information in a format other than the encoded format; and
    storing the information, in the encoded format, in at least one of the victim block's at least one memory addresses.

20. The method of claim 17, wherein copying comprises copying the information stored at the at least one memory address to a memory address that is associated with a rewriteable state that does not require an intervening erase operation.

* * * * *